March 9, 1948.   M. E. CHANDLER   2,437,377
CONTROL APPARATUS FOR INTERNAL-COMBUSTION ENGINES
Filed Feb. 27, 1946   3 Sheets-Sheet 1

INVENTOR.
*Milton E. Chandler*

BY *Lester W Clark*

AGENT

March 9, 1948.  M. E. CHANDLER  2,437,377

CONTROL APPARATUS FOR INTERNAL-COMBUSTION ENGINES

Filed Feb. 27, 1946  3 Sheets-Sheet 2

INVENTOR:
MILTON E. CHANDLER
BY: Lester W Clark
AGENT

March 9, 1948.  M. E. CHANDLER  2,437,377
CONTROL APPARATUS FOR INTERNAL-COMBUSTION ENGINES
Filed Feb. 27, 1946  3 Sheets-Sheet 3
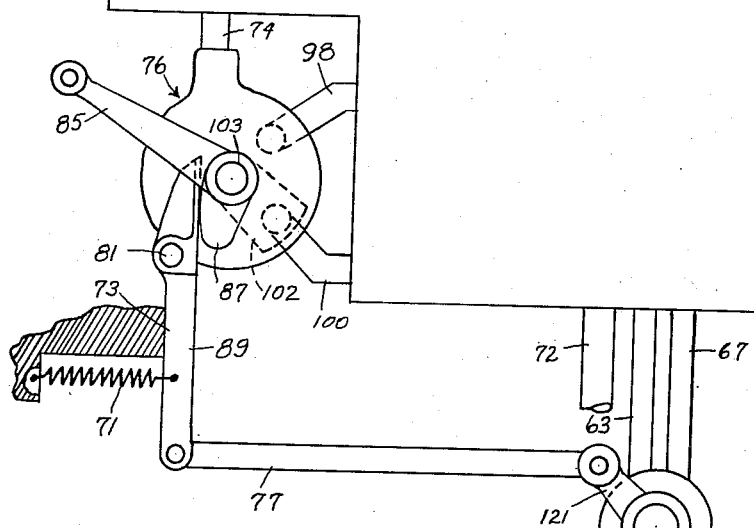
FIG. 7
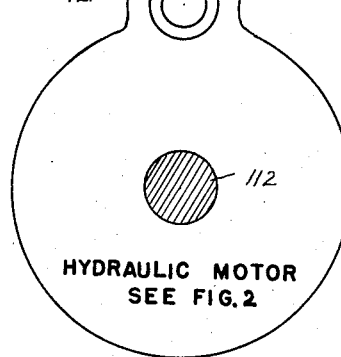
INVENTOR
MILTON E. CHANDLER
BY
*Lester W. Clark*
AGENT.

Patented Mar. 9, 1948

2,437,377

UNITED STATES PATENT OFFICE 2,437,377

CONTROL APPARATUS FOR INTERNAL-COMBUSTION ENGINES

Milton E. Chandler, New Britain, Conn., assignor, by mesne assignments, to Niles-Bement-Pond Company, West Hartford, Conn., a corporation of New Jersey Application February 27, 1946, Serial No. 650,624

18 Claims. (Cl. 123—140)

The present invention relates to apparatus for controlling fuel supply to internal combustion engines; and particularly to the general type of fuel supply systems in which fuel, unmixed with air, is injected directly into the engine combustion chambers, or directly into the intake manifold just outside the cylinder intake ports.

The type system referred to usually employs a set of injection pumps, one for each cylinder, and means are provided for simultaneous control of the capacity per stroke of all pumps, in order to regulate both total fuel flow and the quantity of fuel delivered to each combustion chamber.

An essential requirement of such a system is that fuel flow may be proportional to air flow under all conditions of operation. Some means which effectively measures the air flow is therefore commonly provided to control the injection pump delivery and thereby the fuel flow. In order to stop an engine provided with such a system, it is desirable to over-ride the normal control so as to set the injection pump delivery control at its minimum or zero position.

An object of the present invention is to provide an improved system of the character described wherein a fuel meter is made to control a hydraulic motor by means of a servo-valve intermediately disposed therebetween, in proportion to air flow or as otherwise determined by the fuel meter to satisfy peculiar requirements of the engine.

Additional objects are to provide a simplified form of fuel meter for the purpose stated, and to provide a system in which engine speed and load changes have a minimum effect on the accuracy of fuel metering.

A further object is to provide an over-ride mechanism operable to render the servo-motor unresponsive to motor fluid pressure, thereby allowing the injection pumps to be set for minimum or zero delivery.

Other objects and advantages of the present invention will become apparent from a consideration of the appended specification, claims and drawings, in which Figure 1 illustrates, somewhat diagrammatically, a fuel supply system for an internal combustion engine for aircraft embodying the principles of my invention;

Figure 7 illustrates, somewhat diagrammatically, means for operating the motor by-pass valve by movement of the mixture control of Figure 1.

Figure 1:
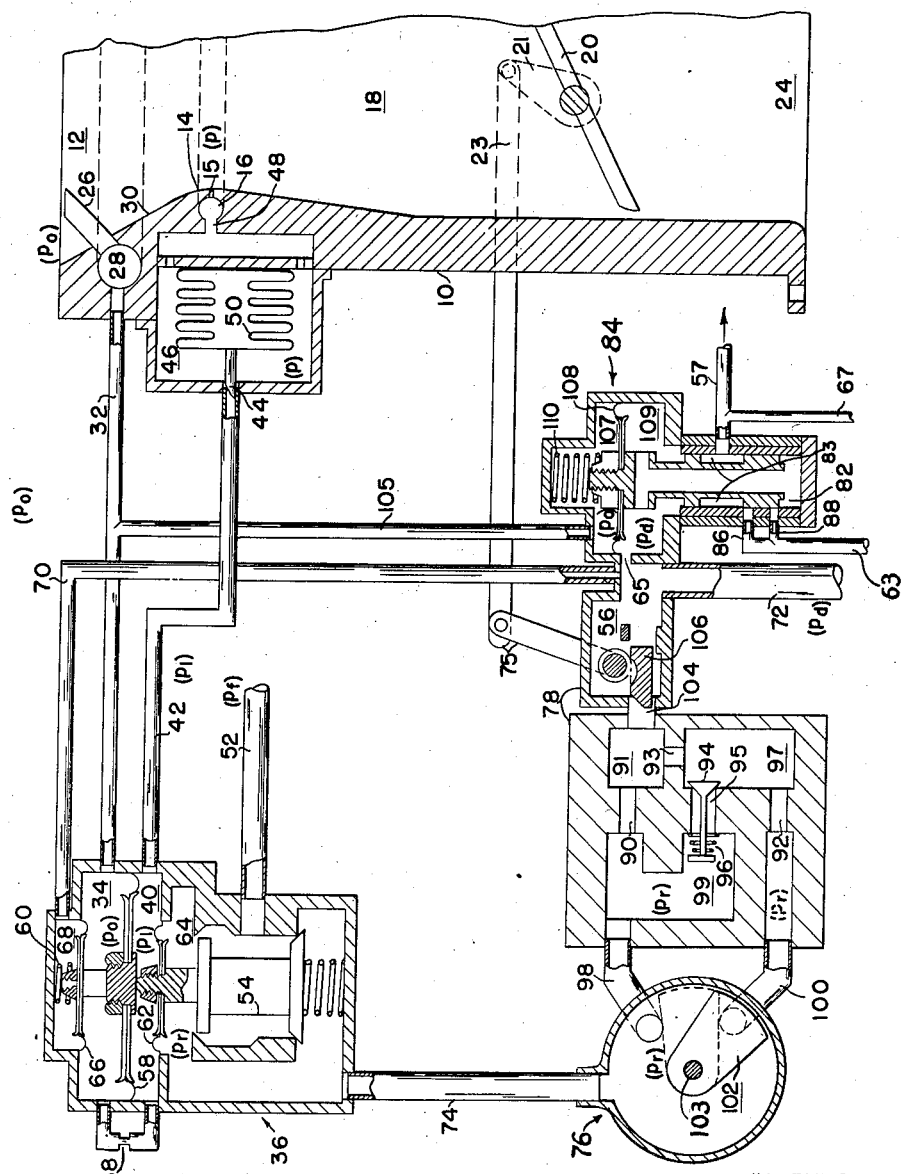

Reference characters designating the pressures existing in the various units, which are shown on the drawing (in parentheses) where applicable, are itemized as follows for reference purposes:

$p_o$, air pressure at impact tubes
$p$, air pressure at Venturi throat
$p_1$, regulated air pressure at fuel meter
$p_o$—$p$, Venturi air pressure differential
$p_o$—$p_1$, mass air flow metering pressure differential
$p_f$, inlet fuel pressure from fuel pump
$p_r$, regulated fuel pressure (at upstream side of metering restrictions)
$p_d$, discharge fuel pressure (at downstream side of metering restrictions)
$p_h$, motor fluid supply pressure; maximum (=$p_d$ as shown on drawing)
$p_b$, motor fluid supply pressure; minimum
$p_m$, motor pressure differential component; maximum
$p_r$—$p_d$, fuel pressure differential, across metering jet system
$p_m$—$p_b$, motor pressure differential

Figure 1

Referring to the drawing, there is shown a body 10 of a carburetor for an internal combustion engine, the interior of which serves as a conduit for all air delivered into the engine. Air enters at an inlet 12; and flows thru a metering venturi 14 and a passage 18, past a throttle 20 to an outlet 24. A supercharger may be used upstream from inlet 12, or downstream from outlet 22; or a combination of superchargers so located may be employed.

Pressure head at the throat of venturi 14 is rendered measurable by provision of ports 15 leading to interconnected channels 16, the number of ports 15 and their location being such as will permit an accurate measure of static pressure $p$ at entrance to ports 15.

Total head at the inlet 12 is rendered measurable by provision of impact tubes 26 leading to interconnected channels 28, the number and location of impact tubes 26 being such that a satisfactory traverse of the airstream is obtained at the outer ends of tubes 26, which are open to receive impact pressure $p_o$ of the entering air.

The "Venturi air pressure differential," $p_o$—$p$, varies substantially in accordance with the square of the velocity of air flowing thru the venturi;

and, since cross-sectional area of venturi 14 is fixed, the "Venturi air pressure differential," $p_o-p$, is a volumetric measure of air flow.

In order to obtain a gravimetric measure of airflow, an amount of air sufficiently small to prevent air metering deficiency is allowed to flow from inlet 12 into impact tubes 26, thru conduits 28 and 32 into a chamber 34 of a fuel meter generally indicated at 36, thru a restriction 38 into a chamber 40 in fuel meter 36, out of chamber 40, thru a conduit 42, past a valve 44 and into a chamber 46; thence into conduits 48, 16 and 15 to the throat of venturi 14; i. e. from pressure $p_o$ to pressure $p$, via the path defined.

The valve 44 is operated by a bellows 50, one end of which is fixed in chamber 46. Bellows 50 is made responsive to temperature changes by enclosure therein of a suitable temperature responsive gas or vapor before sealing, whereby bellows 50 also becomes pressure responsive. Pressure and temperature in chamber 46 are the same as pressure at the Venturi throat; and, therefore, movement of valve 44 is a function of air density changes at the Venturi throat.

Valve 44 moves toward open position as the air density in chamber 46 increases, and toward closed position as the air density decreases. As the volume rate of flow of a given constant mass air flow increases owing to a decrease of air density, the "Venturi pressure differential," $p_o-p$, increases and the component pressure drop $p_1-p$, across valve 44 increases; but valve 44 moves toward closed position sufficiently to restrict flow past the valve the amount required to maintain a substantially constant value of component drop, $p_o-p_1$, across restriction 38 and thereby across diaphragm 58 which separates chambers 34 and 40.

A lesser amount of movement than is required for density compensation is imparted to the valve as a result of changes in mass air flow of constant density, but it is nevertheless possible to contour valve 44 so that the "mass air flow metering pressure differential," $p_o-p_1$, is an acceptable measure of mass air flow at all values of air flow.

Figure 4:
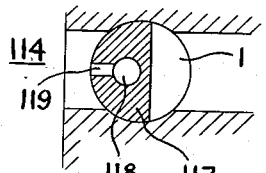
Figure 4 shows a cross-sectional view of the by-pass valve rotated 90° from the position shown in Figure 3.

Fuel at superatmospheric pressure, supplied to the carburetor by a fuel pump or other means, enters conduit 52 which carries it to a fuel inlet valve 54 in fuel meter 36. Principal elements in the course of flow from inlet valve 54 are, successively: a fuel chamber 64, a conduit 74, a manually operated mixture control 76, a jet system 78 including a chamber 56, and a conduit 72 which carries the fuel directly to a set of injection pumps, one of which is shown in Figure 4, thence to the spray nozzles also as shown in Figure 4.

In fuel meter 36, a diaphragm 62 separates chamber 40 from chamber 64 in which the fuel pressure is the same as that on the upstream side of jet system 78, and is designated $p_r$; a like diaphragm 66 separates chamber 34 from a chamber 68 in which the fuel pressure is the same as that on the downstream side of jet system 78, and is designated $p_d$. The fuel inlet valve 54 is subject to controlling forces as follows: the force produced by the "mass air metering pressure differential," $p_o-p_1$, acting on diaphragm 58, tends to open the valve; the force produced by fuel pressure $p_d$, acting on diaphragm 66, tends to open the valve and the force produced by fuel pressure $p_r$, acting on diaphragm 62, tends to close the valve, so that the net force produced by the fuel pressure differential $p_r-p_d$ acting on diaphragm 62 and 66 tends to close the valve.

At any constant value of mass airflow, the air pressure differential $p_o-p_1$ is a constant value acting on diaphragm 58 to move valve 54 in an opening direction. Similarly, for any condition of constant jet area in jet system 78 the fuel pressure differential $p_r-p_d$ is a measure of fuel flow reacting on diaphragms 62 and 66 in a closing direction. Upon simultaneous occurrence of these conditions inlet valve 54 is actuated to a position of equilibrium in which the opposed controlling forces are equal or in which the force proportional to mass air flow equals the force proportional to fuel flow, in consequence of which fuel flow is proportional to air flow.

Jet system 78 comprises fixed area restrictions 90, 92 and 93; and an orifice 95 controlled by a pressure-responsive enrichment valve 94 biased to closed position by spring 96. Mixture control valve 102 is shown in full lines in its "lean" position which allows fuel to flow thru conduit 98 into chamber 99 thru jet 90 and into chamber 91. Rotation of valve 102 to the dotted line or "rich" position permits fuel to flow thru conduit 100 and jet 92 into chamber 97, thence thru jet 93 and into chamber 91.

From chamber 91, all fuel enters an orifice 104 which is effective to meter the fuel when the idle valve 106 is moved into orifice 104 in response to movement of throttle valve 20, lever 21, link 23, and lever 75. Valve 106 is effective within a relatively short range of throttle movement from closed throttle to a part-throttle position. When the throttle passes out of that range of movement, the valve 106 is retracted so that it no longer restricts the flow of fuel.

In the description, thus far, it is shown that the fuel is measured as a function of the fuel pressure differential $p_r-p_d$ which is controlled by fuel meter 36. To make such control possible however, it is necessary to maintain the low pressure component $p_d$ of the fuel pressure differential within a range of values that will always be less than the minimum value of inlet pressure $p_f$ by an amount slightly greater than maximum pressure loss occurring between conduits 52 and 72. A motor pressure regulator 84, in cooperation with the motor shown in Figure 2, controls discharge pressure $p_d$. Elements of regulator 84 include: a chamber 107 connected by a conduit 105 to conduit 32 at impact pressure $p_o$; a chamber 109 supplied with fuel at pressure $p_d$ through a conduit 65; and a diaphragm 108, separating chambers 107 and 109, attached to a valve 82, the position of which is determined by the force on diaphragm 108 due to the regulator pressure differential $p_d-p_o$ and by an opposing force due to spring 110.

Figure 2:
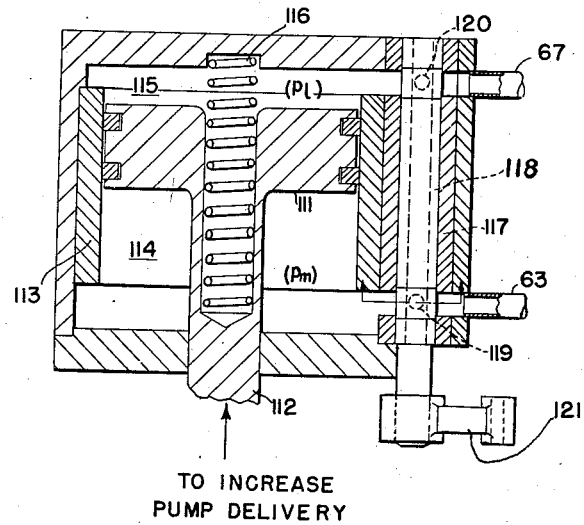
Figure 2 shows a cross-sectional view of a hydraulic motor and a by-pass valve therefor built in accordance with principles of my invention.

In a condition of equilibrium, pressure $p_d$ has a predetermined value and valve 82 closes entrances to channels 86 and 88 which converge into a single conduit 63 which is connected to a chamber 114 in the motor shown in Figure 2. A conduit 57 leads to the fuel tank or other region of suitably low pressure, such as $p_o$. A conduit 67 connects the conduit 57 to motor chamber 115, also shown in Figure 2.

The hydraulic motor, as shown in Figure 2, includes a piston 111 separating chambers 114 and 115, and a piston rod 112 operated by the piston. The position of piston 111 is determined by the equilibrium of forces due to the motor pressure differential $p_h-p_1$ and a spring 116 which biases the piston 111 for movement in a downward direction, as it appears in Figure 2. Whenever unbalance of these forces occurs, piston rod 112 moves to actuate the injector pump delivery control illustrated in Figure 4, until equilibrium is again restored.

In operation, when pressure differential $p_d - p_o$ at the motor pressure regulator 84 tends to exceed the predetermined setting value, valve 82 moves upward in opposition to the spring, opens a valve port between conduit 88 and chamber 109 allowing fuel from chamber 109 to enter conduit 88 and flow to motor chamber 114, Figure 2, in which the resulting $p_h$ pressure increase moves piston 111 upwardly, thereby causing actuation of pump delivery regulating means to increase pump delivery. As pump delivery increases, the pressure $p_d$ in conduits 72 and 65 and in chamber 109 decreases until the predetermined value of $p_d - p_o$ is restored.

Similarly, when pressure differential $p_d - p_o$ at regulator 84, Figure 1, tends to drop below the predetermined setting value, valve 82 moves in cooperation with spring 110, opens a valve port between conduit 86 and chamber 83, thereby allowing fuel to flow from motor chamber 114, into conduit 63 to conduit 86, into chamber 83 to conduit 57. The pressure $p_h$ in chamber 114 is thus equalized with that in chamber 115 and the spring 116 then moves the piston 111 downwardly, operating the pump delivery regulating means to decrease pump delivery. This increases pressure $p_d$ and pump delivery continues to decrease until the pressure differential $p_d - p_o$ increases to the predetermined value.

In Figure 1, fuel is used as the motor fluid; oil or other fluid at suitably high pressure may be employed equally well with slight modification of regulator valve 82. Other equivalent forms of servo-motors and control valves therefor may also be used.

In order that the injection pumps may be immediately operated to minimum delivery position, the by-pass valve 117, Figure 2, is provided. Valve 117 is operable by a lever 121 to a position shown in Figure 4 which permits motor fluid to flow from chamber 114 thru conduits 119, 118, and 120, into chamber 115. In that position, valve 117 also blocks the conduits 63 and 67, so that pressure $p_h$ in chamber 114 equals pressure $p_b$ in chamber 115 and the motor is made solely responsive to a spring 116 which moves the pump delivery control to minimum delivery position. When lever 121 operates valve 117 into a position in which entrance to conduit 119 is blocked, as shown in Figure 3, chambers 114 and 115 are not connected and the motor pressure differential is controlled by regulator valve 82, Figure 1.

Figure 3:
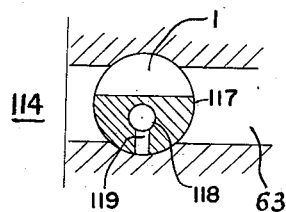
Figure 3 shows a cross-sectional view of the by-pass valve referred to, taken on the line 3—3 of Figure 2 and looking in the direction of the arrows.

Valve 117 is linked to the valve 102, as shown in Figure 7, so that valve 117 is normally positioned as illustrated in Figure 3 when the mixture control valve is in either "lean" or "rich" positions shown by solid and dotted lines respectively in Figure 1. When valve 102 is moved from "lean" position in a clockwise direction, by means of a mixture control lever 85 attached to shaft 103, valve 117 is operated to full by-pass and cut-off position (Figure 4) by the arrangement shown in Figure 7, in which a cam 87 fixed to shaft 103 engages one end of a lever 89 having a fixed pivot 81, a link 77 connecting the other end of lever 89 with lever 121. A spring 71 holds lever 89 against a stop 73 when the mixture control valve is in "lean" or "rich" or intermediate positions.

On stopping the engine, the mixture control lever 85 is moved counterclockwise to an extreme position at which lever 21 moves valve 117 into the full by-pass and cut-off position of Figure 4.

The motor piston 111 immediately starts moving to minimum delivery position and the engine is thus quickly cut off from its fuel supply. As the engine decelerates, the air flow decreases and the pressure $p_d$ in chamber 109, Figure 1, decreases. This pressure decrease, however, lags behind fuel pump delivery decrease and, because the mixture control valve remains open when cut-off occurs at by-pass valve 117, fuel is constantly supplied to conduit 72 and to the injection pumps at a pressure which prevents accumulation of vapor upstream from the injection pumps. On starting the engine, therefore, initial charges of fuel unmixed with vapor are obtained and one source of difficult starting is thereby eliminated.

Figure 5:
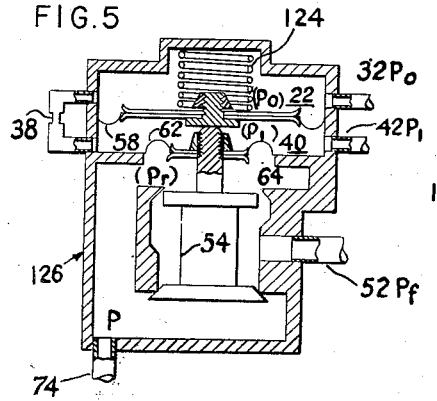
Figure 5 shows, somewhat diagrammatically, a modified form of fuel meter which may be used in the system of Figure 1.

*Figure 5*

Referring to the drawing, there is shown a modified form of fuel meter, generally indicated as 126, usable in the system of Figure 1 and essentially the same as fuel meter 36 of Figure 1, except for omission of diaphragm 66, chamber 68, and conduit 70. Elements common to both fuel meters 36 and 126 are designated identically.

Fuel at superatmospheric pressure, supplied to the carburetor by a fuel pump or other means, enters conduit 52 which carries it to a fuel inlet valve 54 whence it flows past valve 54 to a chamber 64 and into a conduit 74 from which the further course of flow is the same as for Figure 1.

In fuel meter 126, a diaphragm 62 having a fixed connection with valve 54 separates chamber 40 from chamber 64, in which the fuel pressure is the same as that on the upstream side of jet system 78, Figure 1, and is designated $p_r$. Chamber 40 is separated from a chamber 122 by a second diaphragm 58 which also operates in contact with valve 54. Chambers 122 and 40 are connected thru restriction 38 and are respectively maintained at pressures $p_o$ and $p_1$ by means of conduits 32 and 34, as has been described in connection with Figure 1.

The fuel inlet valve 54 is subject to controlling forces as follows: the force produced by the "mass air metering pressure differential" $p_o - p_1$, acting on diaphragm 58, and tending to open the valve; and by the opposing force produced by the pressure differential $p_r - p_1$, acting on diaphragm 62 and tending to close the valve. A spring 124 biases the valve 54 toward an open position with another force equal to that obtainable by means of a diaphragm like diaphragm 62 subjected to pressure differential $p_d - p_o$, established by the motor pressure regulator 84 of Figure 1.

At any constant value of mass air flow, valve 54 is subjected to a downward force due to the "mass air metering differential" $p_o - p_1$, acting on diaphragm 62 plus the above specified fixed load on spring 124, the total of those two forces being equivalent to a force produced by the fuel pressure $p_r$ acting upwardly on diaphragm 62.

Similarly, for any condition of constant jet area in jet system 78 the fuel pressure differential $p_r - p_d$ is a measure of fuel flow; whence, upon simultaneous occurrence of these conditions (constant mass air flow and constant jet area), inlet valve 54 is actuated to a position of equilibrium in which a force proportional to mass air flow equals a force proportional to fuel flow, in consequence of which fuel flow is proportional to air flow. The spring 124 may be adjusted to provide a slightly greater load than that specified, in order to increase fuel flow in a range of air flow in which the differential $p_o - p_1$ does not satisfy usual requirements.

Figure 6:
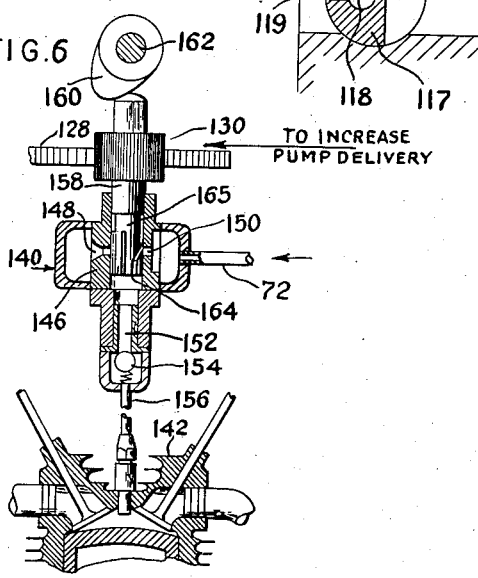
Figure 6 illustrates a cross-sectional view of a common type of injection pump nozzle assembled into an engine combustion chamber, and a similarly conventional injection pump connected therewith.

It is readily apparent that simplification of the fuel meter as shown in Figure 5 is made possible only by virtue of the function of the motor pressure regulator 84, Figure 1, the associated motor, Figure 2, and the fuel injection pump, Figure 6. These associated elements maintain a constant value of differential $p_d - p_o$; i. e., at a constant value of pressure $p_o$, the motor pressure regulator 84 maintains a constant pressure $p_d$ on the downstream side of jet system 78 by controlling the motor, Figure 2, in a manner which permits the latter to set the injection pump delivery to take away all fuel flowing from the jets at the predetermined constant value of pressure $p_d$. The injection pump delivery is therefore, in effect, controlled in response to air flow thru the carburetor.

*Figure 6*

Referring to the drawing, there is shown one of the injection pumps 140 of conventional type, it being understood that there is a plurality of such pumps corresponding to the number of cylinders 142 of the engine. The pump 140 has a hollow outer body 144 to which fuel is supplied thru a branch of the fuel conduit 72.

Positioned within the outer body 144 is an inner body 146 having ports 148 and 150 connecting a chamber in the outer body with a central bore or cylinder in the inner body. The bore in the inner body 146 is open at the bottom and communicates with a conduit 152 which in turn communicates thru a self-closing ball check valve 154 with a conduit 156 leading directly into the motor cylinder 142. Mounted in the central bore for both longitudinal and rotative movement is a plunger 158 carrying, at its projecting upper end, the before-mentioned gear 130 meshing with the rack 128. The plunger 158 is reciprocated by a cam 160 on a shaft 162 driven by the engine.

When the engine is in operation the shaft 162, with the several cams 160 thereon, is operated to move the plunger 158 of each injector pump downward so as to deliver a charge of fuel to the engine cylinder at a proper time in relation to the cycle of the engine piston. The plunger 158 has a contoured recess 164 formed therein which provides communication between the ports 148 and 150 and the cylinder ahead of plunger 158. The point in the travel of plunger 158 at which pumping starts is determined by the angular position of the plunger, which determined the point at which port 148 is closed by the helically contoured portion of recess 164. The plunger 158 is rotated by the rack 128 and the gear 130 thru the action of the servo-motor as already described. When the servo or fluid motor piston 116 is in its uppermost position, as viewed in Figure 1, the port 148 is aligned with the vertical portion of recess 164, appearing at the center of plunger 158 in Figure 2, so that no pressure is built up by the downward stroke of plunger 158 and no fuel is injected thru valve 154 into the engine cylinder; as the piston 116 is moved downward, increased amounts of fuel are admitted into the injector pump and injected into the engine cylinder; and when the piston 116 is in its lowermost position the charge of fuel injected into the cylinder is at the maximum. The point in the stroke of plunger 158 at which pumping terminates is always the same, being established by the uncovering of port 150 by the annular groove 165 which communicates thru recess 164 with the cylinder ahead of plunger 158.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. A fuel supply system for an internal combustion engine, comprising a first conduit for air flowing into said engine for combustion purposes, means in said first conduit effective to produce an air pressure differential that is a measure of the air flow; a second conduit for fuel flowing into said engine, a metering orifice in said second conduit, the fuel pressure differential across said orifice being a measure of the fuel flow therethru, and a fuel meter responsive to said air pressure differential effective to vary said fuel pressure differential whereby said fuel flow is proportional to said airflow; an injector pump mechanism for delivering fuel to said engine, means in said mechanism to vary the rate of said fuel delivery, a passage for flow of fuel discharged from said metering orifice to said injector pump mechanism, and hydraulic motor means for positioning said delivery varying means; means for controlling said motor means including a valve having a normal position in which said motor means is stationary and effective upon opposite movements from said normal position to cause operation of said motor means in opposite directions, and means responsive to the metering orifice discharge pressure for operating said valve.

2. A fuel supply system for an internal combustion engine, comprising a first conduit for air flowing into said engine for combustion purposes, means in said first conduit effective to produce an air pressure differential that is a measure of the air flow; a second conduit for fuel flowing into said engine, a metering orifice in said second conduit, the fuel pressure differential across said orifice being a measure of the fuel flow therethru, and a fuel meter responsive to said air pressure differential effective to vary said fuel pressure differential whereby said fuel flow is proportional to said airflow; an injector pump mechanism for delivering fuel to said engine, means in said mechanism to vary the rate of said fuel delivery, a passage for flow of fuel discharged from said metering orifice to said injector pump mechanism, and hydraulic motor means for positioning said delivery varying means; means for controlling said motor means including a valve having a normal position in which said motor means is stationary and effective upon opposite movements from said normal position to cause operation of said motor means in opposite directions, means responsive to the metering orifice discharge pressure for operating said valve, and spring means biasing said pressure responsive means in opposition to said metering orifice discharge pressure.

3. A fuel supply system for an internal combustion engine, comprising a first conduit for air flowing into said engine for combustion purposes, means in said first conduit effective to produce an air pressure differential that is a measure of the air flow; a second conduit for fuel flowing into said engine, a metering orifice in said second conduit, the fuel pressure differential across said orifice being a measure of the fuel flow therethru, and a fuel meter responsive to said air pressure differential effective to vary said fuel pressure differential whereby said fuel flow is proportional to said air flow; an injector pump mechanism for delivering fuel to said engine, means in said mechanism to vary the rate of said fuel delivery, a passage for flow of fuel discharged from said metering orifice to said injector pump mechanism, and hydraulic motor means for positioning said delivery varying means; means for controlling said motor means including a valve having a normal position in which said motor means is stationary and effective upon opposite movements from said normal position to cause operation of said motor means in opposite directions, means for operating said valve responsive to a control pressure differential between the metering orifice discharge pressure and an air pressure substantially equal to atmospheric pressure, and spring means biasing said pressure responsive means in opposition to said control pressure differential; said pressure responsive means, said spring, said valve and said delivery varying means being effective to maintain said second pressure differential at a substantially constant predetermined value.

4. A fuel supply system for an internal combustion engine, comprising a first conduit for air flowing into said engine for combustion purposes, means in said first conduit effective to produce an air pressure differential that is a measure of the air flow; a second conduit for fuel flowing into said engine, a metering orifice in said second conduit, the fuel pressure differential across said orifice being a measure of the fuel flow therethru, and a fuel meter responsive to said air pressure differential effective to vary the fuel pressure upstream from said metering orifice; an injector pump mechanism for delivering fuel to said engine, means in said mechanism to vary the rate of said fuel delivery, a passage for flow of fuel discharged from said metering orifice to said injector pump mechanism, and hydraulic motor means for positioning said delivery varying means; means for controlling said motor means including a valve having a normal position in which said motor means is stationary and effective upon opposite movements from said normal position to cause operation of said motor means in opposite directions, means for operating said valve responsive to a second pressure differential between the metering orifice discharge pressure and an air pressure substantially equal to atmospheric pressure, and spring means biasing said pressure responsive means in opposition to said second pressure differential; said pressure responsive means, said spring, said valve and said delivery varying means being effective to maintain said second pressure differential at a substantially constant predetermined value, whereby said fuel meter is effective to vary said fuel flow in proportion to said air flow.

5. A fuel supply system for an internal combustion engine, comprising a first conduit for air flowing into said engine for combustion purposes, means in said first conduit effective to produce an air pressure differential that is a measure of the air flow; a second conduit for fuel flowing into said engine, a metering orifice in said second conduit, the fuel pressure differential across said orifice being a measure of the fuel flow therethru, and a fuel meter responsive to said air pressure differential and said fuel pressure differential for varying said fuel flow proportionally to said airflow; an injector pump mechanism for delivering fuel to said engine, means in said mechanism to vary the rate of said fuel delivery, a passage for flow of fuel discharged from said metering orifice to said injector pump mechanism, and hydraulic motor means for positioning said delivery varying means; means for controlling said motor means including a valve having a normal position in which said motor means is stationary and effective upon opposite movements from said normal position to cause operation of said motor means in opposite directions, means responsive to the metering orifice discharge pressure for operating said valve, and spring means biasing said pressure responsive means in opposition to said metering orifice discharge pressure.

6. A fuel supply system for an internal combustion engine, comprising a first conduit for air flowing into said engine for combustion purposes, means in said first conduit effective to produce an air pressure differential that is a measure of the air flow; a second conduit for fuel flowing into said engine, a metering orifice in said second conduit, the fuel pressure differential across said orifice being a measure of the fuel flow therethru, and a fuel meter responsive to said air pressure differential and to the fuel pressure upstream from said metering orifice effective to vary said fuel pressure differential whereby said fuel flow is proportional to said air flow; an injector pump mechanism for delivering fuel to said engine, means in said mechanism to vary the rate of said fuel delivery, a passage for flow of fuel discharged from said metering orifice to said injector pump mechanism, and hydraulic motor means for positioning said delivery varying means; means for controlling said motor means including a valve having a normal position in which said motor means is stationary and effective upon opposite movements from said normal position to cause operation of said motor means in opposite directions, means responsive to the metering orifice discharge pressure for operating said valve, and spring means biasing said pressure responsive means in opposition to said metering orifice discharge pressure.

7. A fuel supply system for an internal combustion engine, comprising a first conduit for air flowing into said engine for combustion purposes, means in said first conduit effective to produce an air pressure differential that is a measure of the air flow; a second conduit for fuel flowing into said engine, a metering orifice in said second conduit, the fuel pressure differential across said orifice being a measure of the fuel flow therethru, and a fuel meter responsive to said air pressure differential and to the fuel pressure upstream from said metering orifice effective to vary said upstream pressure; an injector pump mechanism for delivering fuel to said engine, means in said mechanism to vary the rate of said fuel delivery, a passage for flow of fuel discharged from said metering orifice to said injector pump mechanism, and hydraulic motor means for positioning said delivery varying means; means for controlling said motor means including a valve having a normal position in which said motor means is stationary and effective upon opposite movements from said normal position to cause operation of said motor means in opposite directions, means for operating said valve responsive to a second pressure differential between the metering orifice discharge pressure and an air pressure substantially equal to atmospheric pressure, and spring means biasing said pressure responsive means in opposition to said second pressure differential; said pressure responsive means, said spring, said valve and said delivery varying means being effective to maintain said second pressure differential at a substantially constant predetermined value, whence said fuel flow is proportional to said air flow.

8. A fuel supply system for an internal combustion engine, comprising a first conduit for air flowing into said engine for combustion purposes, means in said first conduit effective to produce an air pressure differential that is a measure of the air flow; a second conduit for fuel flowing into said engine, a metering orifice in said second conduit, the fuel pressure differential across said orifice being a measure of the fuel flow therethru, and a fuel meter responsive to said air pressure differential effective to vary said fuel pressure differential whereby said fuel flow is proportional to said air flow; an injector pump mechanism for delivering fuel to said engine, means in said mechanism to vary the rate of said fuel delivery, a passage for flow of fuel discharged from said metering orifice to said injector pump mechanism, and hydraulic motor means for positioning said delivery varying means in response to a motor pressure differential supplied thereto; means controlling the motor pressure differential in said hydraulic motor means by regulating at least one component pressure of said motor pressure differential thereby controlling said hydraulic motor means, said means controlling said motor pressure differential including a valve having a normal position in which said motor means is stationary and effective upon opposite movements from said normal position to cause operation of said motor means in opposite directions, and means responsive to the metering orifice discharge pressure for operating said valve.

9. A fuel supply system for an internal combustion engine, comprising a first conduit for air flowing into said engine for combustion purposes, means in said first conduit effective to produce an air pressure differential that is a measure of the air flow; a second conduit for fuel flowing into said engine, a metering orifice in said second conduit, the fuel pressure differential across said orifice being a measure of the fuel flow therethru, and a fuel meter responsive to said air pressure differential effective to vary said fuel pressure differential whereby said fuel flow is proportional to said air flow; an injector pump mechanism for delivering fuel to said engine, means in said mechanism to vary the rate of said fuel delivery, a passage for flow of fuel discharged from said metering orifice to said injector pump mechanism, hydraulic motor means for positioning said delivery varying means in response to a motor pressure differential applied thereto, and spring means biasing said motor means for movement in a delivery decreasing direction; first means for controlling said motor means including a valve having a normal position in which said motor means is stationary and effective upon opposite movements from said normal position to cause operation of said motor means in opposite directions, and means responsive to the metering orifice discharge pressure for operating said valve; and second means for controlling said motor means, said second means comprising a motor by-pass valve and means for operating said by-pass valve between a first position in which it by-passes said motor means and a second position in which said motor means is controlled by said first motor control means alone, said motor by-pass valve being effective to render said first means ineffective by reducing said motor pressure differential to zero value, thereby allowing said spring means to position said fuel delivery varying means for minimum delivery from said injection pumps.

10. Valve mechanism for selectively connecting one pair of fluid conduits to a second pair of conduits or to each other, comprising a cylinder, a piston rotatable in said cylinder, said piston having an internal passage extending longitudinally thereof, each end of said passage terminating in one of a pair of generally radial passages extending from said internal passage to spaced ports on the exterior of said piston, said piston having a pair of recesses in its peripheral surface located substantially diametrically opposite said ports and extending circumferentially of said piston for less than half of the periphery thereof, said cylinder having a first pair of ports spaced angularly and longitudinally the same as said piston ports and leading to said one pair of conduits so as to connect said conduits with each other thru said internal passage when said piston is in a first position wherein said piston ports are aligned with said first pair of cylinder ports, said cylinder also having a second pair of ports leading to said second pair of conduits and located substantially diametrically opposite said first pair of cylinder ports, so that each of said first pair of ports is connected thru its associated recess in said piston with one of said second pair of ports, and said piston ports are blocked by the cylinder walls when said valve is rotated to a second position substantially ninety degrees from said first position, and means for rotating said piston.

11. Hydraulic control apparatus, comprising a fluid motor having a pair of expansible chambers separated by a movable wall, a first pair of fluid supply conduits connected respectively to said pair of chambers; control means for said motor including a source of motive fluid under pressure, a drain conduit, a second pair of fluid conduits, a first control valve for selectively connecting one of said second pair of conduits to said source or to said drain conduit, and a second control valve for selectively connecting said first pair of fluid conduits to said second pair of conduits or to each other, said second valve comprising a cylinder, a piston rotatable in said cylinder, said piston having an internal passage extending longitudinally thereof, each end of said passage terminating in one of a pair of generally radial passages extending from said internal passage to spaced ports on the exterior of said piston, said piston having a pair of recesses in its peripheral surface located substantially diametrically opposite said ports and extending circumferentially of said piston for less than half of the periphery thereof, said cylinder having a first pair of ports spaced angularly and longitudinally the same as said piston ports and leading to said one pair of conduits so as to connect said conduits with each other thru said internal passage when said piston is in a first position wherein said piston ports are aligned with said first pair of cylinder ports, said cylinder also having a second pair of ports leading to said second pair of conduits and located substantially diametrically opposite said first pair of cylinder ports, so that each of said first pair of ports is connected thru its associated recess in said piston with one of said second pair of ports and said piston ports are blocked by the cylinder walls when said valve is rotated to a second position substantially ninety degrees from said first position, and means for rotating said piston, said second valve being effective in said first position to place said first valve in control of said motor and in said second position to terminate control of said motor by said first valve.

12. Hydraulic control apparatus, comprising a fluid motor having a pair of expansible chambers separated by a movable wall, a spring biasing said wall in a direction to collapse one of said chambers, a first pair of fluid supply conduits connected respectively to said pair of chambers; control means for said motor including a source of motive fluid under pressure, a drain conduit, a second pair of fluid conduits, a first control valve for selectively connecting one of said second pair of conduits to said source or to said drain conduit, and a second control valve for selectively connecting said first pair of fluid conduits to said second pair of conduits or to each other, said second valve comprising a cylinder, a piston rotatable in said cylinder, said piston having an internal passage extending longitudinally thereof, each end of said passage terminating in one of a pair of generally radial passages extending from said internal passage to spaced ports on the exterior of said piston, said piston having a pair of recesses in its peripheral surface located substantially diametrically opposite said ports and extending circumferentially of said piston for less than half of the periphery thereof, said cylinder having a first pair of ports spaced angularly and longitudinally the same as said piston ports and leading to said one pair of conduits so as to connect said conduits with each other thru said internal passage when said piston is in a first position wherein said piston ports are aligned with said first pair of cylinder ports, said cylinder also having a second pair of ports leading to said second pair of conduits and located substantially diametrically opposite said first pair of ports, so that each of said first pair of ports is connected thru its associated recess in said piston with one of said second pair of ports and said piston ports are blocked by the cylinder walls when said valve is rotated to a second position substantially ninety degrees from said first position, and means for rotating said piston, said second valve being effective in said first position to place said first valve in control of said motor and in said second position to cause collapse of one of said chambers by said spring.

13. A fuel supply system for an internal combustion engine, comprising fuel injector pump mechanism, means for varying the delivery of said injector pump mechanism, and hydraulic motor means for operating said delivery varying means including a pair of expansible chambers separated by a movable wall, a first pair of fluid supply conduits connected respectively to said pair of chambers; control means for said motor including a source of motive fluid under pressure, a drain conduit, a second pair of fluid conduits, a first control valve for selectively connecting one of said second pair of conduits to said source or to said drain conduit, and a second control valve for selectively connecting said first pair of fluid conduits to said second pair of conduits or to each other, said second valve comprising a cylinder, a piston rotatable in said cylinder, said piston having an internal passage extending longitudinally thereof, each end of said passage terminating in one of a pair of generally radial passages extending from said internal passage to spaced ports on the exterior of said piston, said piston having a pair of recesses in its peripheral surface located substantially diametrically opposite said ports and extending circumferentially of said piston for less than half of the periphery thereof, said cylinder having a first pair of ports spaced angularly and longitudinally the same as said piston ports and leading to said one pair of conduits so as to connect said conduits with each other thru said internal passage when said piston is in a first position wherein said piston ports are aligned with said first pair of cylinder ports, said cylinder also having a second pair of ports leading to said second pair of conduits and located substantially diametrically opposite said first pair of ports, so that each of said first pair of ports is connected thru its associated recess in said piston with one of said second pair of ports and said piston ports are blocked by the cylinder walls when said valve is rotated to a second position substantially ninety degrees from said first position, and means for rotating said piston, said second valve being effective in said first position to place said first valve in control of said motor and in said second position to terminate control of said motor by said first valve.

14. A fuel supply system for an internal combustion engine, comprising fuel injector pump mechanism, means for varying the delivery of said injector pump mechanism, and hydraulic motor means for operating said delivery varying means including a pair of expansible chambers separated by a movable wall, a spring biasing said wall in a pump delivery decreasing direction, a first pair of fluid supply conduits connected respectively to said pair of chambers; control means for said motor including a source of motive fluid under pressure, a drain conduit, a second pair of fluid conduits, a first control valve for selectively connecting one of said second pair of conduits to said source or to said drain conduit, and a second control valve for selectively connecting said first pair of fluid conduits to said second pair of conduits or to each other, said second valve comprising a cylinder, a piston rotatable in said cylinder, said piston having an internal passage extending longitudinally thereof, each end of said passage terminating in one of a pair of generally radial passages extending from said internal passage to spaced ports on the exterior of said piston, said piston having a pair of recesses in its peripheral surface located substantially diametrically opposite said ports and extending circumferentially of said piston for less than half of the periphery thereof, said cylinder having a first pair of ports spaced angularly and longitudinally the same as said piston ports and leading to said one pair of conduits so as to connect said conduits with each other thru said internal passage when said piston is in a first position wherein said piston ports are aligned with said first pair of cylinder ports, said cylinder also having a second pair of ports leading to said second pair of conduits and located substantially diametrically opposite said first pair of ports, so that each of said first pair of ports is connected thru its associated recess in said piston with one of said second pair of ports and said piston ports are blocked by the cylinder walls when said valve is rotated to a second position substantially ninety degrees from said first position, and means for rotating said piston, said second valve being effective in said first position to place said first valve in control of said motor and in said second position to cause operation of said delivery varying mechanism to its minimum delivery position.

15. A fuel supply system for an internal combustion engine, comprising fuel injector pump mechanism, means for varying the delivery of said injector pump mechanism, hydraulic motor means for operating said delivery varying means including a pair of expansible chambers separated by a movable wall and a connection between said wall and said delivery varying means, a spring biasing said wall in a delivery decreasing direction, a main control valve for controlling the flow of motive fluid to said chambers so as to selectively move said wall in opposite directions, a by-pass connection between said chambers, a second valve for opening and closing said by-pass connection, said second valve being effective when closed to place said first control valve in control of said motor means and when opened to permit operation of said wall to minimum delivery position by said spring regardless of the position of said first control valve.

16. Hydraulic control apparatus comprising a fluid motor having a pair of expansible chambers separated by a movable wall, a spring biasing said wall in a direction to collapse one of said chambers, a first pair of fluid supply conduits connected respectively to said pair of chambers, a main control valve, connections between said main control valve and said first pair of conduits, said main control valve being effective to control the flow of motive fluid from a source of said fluid under pressure to said chambers, so as to selectively move said wall in opposite directions; a by-pass connection between said chambers, a second valve for opening and closing said by-pass connection, said second valve being effective when closed to place said first control valve in control of said motor means and when opened to permit operation of said wall to one extreme position by said spring regardless of the position of said first control valve.

17. A fuel supply system for an internal combustion engine comprising an air meter for measuring mass air flow to the engine, a fuel meter for controlling fuel flow to said engine according to a predetermined value of the fuel-to-air ratio, a manually-operated mixture control in said fuel meter including a system of metering jets and a rotatable mixture control valve effective to predetermine the fuel-to-air ratio between maximum and minimum operating values, an injector pump mechanism for delivering fuel to said engine and a passage for the flow of fuel thereto from said fuel meter, means in said mechanism to vary the rate of said fuel delivery, hydraulic motor means for positioning said delivery varying means in response to a motor fluid pressure differential supplied thereto, and spring means biasing said motor means for movement in a delivery decreasing direction; first means for controlling said motor means including a valve having a normal position in which said motor means is stationary and effective upon opposite movements from said normal position to cause operation of said motor means in opposite directions, and means responsive to pressure downstream from said fuel meter for operating said valve; second means for controlling said motor means, said second means comprising a motor by-pass valve and means for operating said by-pass valve between a first position in which it by-passes said motor means and cuts off flow of motor fluid thereto and a second position in which said motor means is controlled solely by said first motor control means, a connection between said means for operating said by-pass valve and said manually-operated mixture control, said motor by-pass valve being effective when said mixture control is operated to a motor cut-off position to render said first means ineffective by reducing said motor pressure differential to zero value, thereby allowing said spring means to position said fuel delivery varying means for minimum delivery from said pumps.

18. A fuel supply system for an internal combustion engine, comprising a first conduit for air flowing into said engine for combustion purposes, means in said first conduit effective to produce an air pressure differential that is a measure of the air flow; a second conduit for fuel flowing into said engine, a metering orifice in said second conduit, the fuel pressure differential across said orifice being a measure of the fuel flow therethru, and a fuel meter responsive to said air pressure differential effective to vary said fuel pressure differential whereby said fuel flow is proportional to said airflow; a manually-operated mixture control for varying the area of said orifice effective to control the value of said proportionality of fuel-to-air, an injector pump mechanism for delivering fuel to said engine, means in said mechanism to vary the rate of said fuel delivery, a passage for flow of fuel discharged from said metering orifice to said injector pump mechanism, and hydraulic motor means for positioning said delivery varying means; first means controlling said motor means including a valve having a normal position in which said motor means is stationary and effective upon opposite movements from said normal position to cause operation of said motor means in opposite directions and means responsive to the metering orifice discharge pressure for operating said valve; and second means connected to said mixture control for controlling said motor means independently of said first means whereby when said mixture control is operated to a motor cut-off position said motor actuates said fuel pump delivery varying means for minimum delivery.

MILTON E. CHANDLER.